(12) United States Patent
Kang et al.

(10) Patent No.: US 11,881,634 B2
(45) Date of Patent: Jan. 23, 2024

(54) ANTENNA APPARATUS FOR IDENTIFYING DRONE AND OPERATION METHOD THEREOF

(71) Applicant: ELECTRONICS AND TELECOMMUNICATIONS RESEARCH INSTITUTE, Daejeon (KR)

(72) Inventors: Kyu-Min Kang, Daejeon (KR); Jae Cheol Park, Daejeon (KR); Jinhyung Oh, Daejeon (KR); Dong Woo Lim, Daejeon (KR); Su Na Choi, Daejeon (KR); Sunghyun Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/734,658

(22) Filed: May 2, 2022

(65) Prior Publication Data

US 2022/0359983 A1 Nov. 10, 2022

(30) Foreign Application Priority Data

May 4, 2021 (KR) .................. 10-2021-0058077

(51) Int. Cl.
*H04B 7/06* (2006.01)
*H01Q 3/36* (2006.01)
(Continued)

(52) U.S. Cl.
CPC ................ *H01Q 3/36* (2013.01); *H01Q 3/26* (2013.01); *H01Q 9/285* (2013.01); *H01Q 21/20* (2013.01);
(Continued)

(58) Field of Classification Search
CPC .......... H01Q 3/36; H01Q 21/20; H01Q 9/285; H01Q 9/32; H01Q 9/18; H01Q 3/446;
(Continued)

(56) References Cited

U.S. PATENT DOCUMENTS 8,421,684 B2 * 4/2013 Livneh .................. H01Q 3/446
343/702
8,842,050 B2 * 9/2014 Livneh .................. H01Q 21/293
343/702
(Continued)

FOREIGN PATENT DOCUMENTS

KR 100529709 B1 11/2005
KR 1020060016092 A 2/2006
(Continued)

OTHER PUBLICATIONS

Korean Office Action dated Mar. 29, 2023, in the counterpart Korean Patent Application.

*Primary Examiner* — Vibol Tan
(74) *Attorney, Agent, or Firm* — Rabin & Berdo, P.C.

(57) ABSTRACT

An antenna apparatus for drone identification and an operating method thereof are provided. The antenna apparatus includes: a plurality of horizontal directional antennas; a vertical directional antenna positioned at a center of an area surrounded by the plurality of horizontal directional antennas; a beamforming unit controlling beamforming of the vertical directional antenna and the plurality of horizontal antennas to transmit and receive signals in all directions; and a power supply unit for suppling power.

11 Claims, 6 Drawing Sheets

(51) Int. Cl.
*H01Q 21/20* (2006.01)
*H01Q 3/26* (2006.01)
*H01Q 9/28* (2006.01)

(52) U.S. Cl.
CPC ......... *H04B 7/0617* (2013.01); *H04B 7/0691* (2013.01)

(58) Field of Classification Search
CPC ........ H01Q 3/26; H01Q 3/247; H01Q 21/293; H01Q 19/32; H04B 7/0691; H04B 7/0617
See application file for complete search history.

(56) References Cited

U.S. PATENT DOCUMENTS

| | | | |
|---|---|---|---|
| 9,014,704 B2* | 4/2015 | Hyslop | H01Q 21/29 455/448 |
| 9,166,288 B2* | 10/2015 | Hwang | H01Q 21/20 |
| 9,277,420 B2* | 3/2016 | Hyslop | H01Q 21/29 |
| 10,181,332 B1 | 1/2019 | Laag et al. | |
| 10,790,586 B2* | 9/2020 | Klemes | H01Q 3/36 |
| 2006/0152413 A1 | 7/2006 | Uno et al. | |
| 2009/0270051 A1 | 10/2009 | Choi et al. | |
| 2018/0003816 A1 | 1/2018 | Olson | |
| 2019/0253169 A1 | 8/2019 | Ha et al. | |
| 2020/0278418 A1 | 9/2020 | Lim | |
| 2021/0151880 A1* | 5/2021 | Ouderkirk | G01S 7/032 |

FOREIGN PATENT DOCUMENTS

| | | |
|---|---|---|
| KR | 1020090113124 A | 10/2009 |
| KR | 1020180042266 A | 4/2018 |
| WO | 2004107497 A2 | 12/2004 |
| WO | 2017035029 A1 | 3/2017 |

* cited by examiner

ANTENNA APPARATUS FOR IDENTIFYING DRONE AND OPERATION METHOD THEREOF

CROSS-REFERENCE TO RELATED APPLICATION

This application claims priority to and the benefit of Korean Patent Application No. 10-2021-0058077 filed in the Korean Intellectual Property Office on May 4, 2021, the entire contents of which are incorporated herein by reference.

BACKGROUND OF THE INVENTION

(a) Field of the Invention

The present disclosure relates to drone identification, and more particularly, to an antenna apparatus for identifying a ground drone and an operating method thereof.

(b) Description of the Related Art

With the recent spread of drone use, cases of dysfunction are increasing, wherein the cases of dysfunction include invasion of privacy due to illegal video recording using drones or drone crashes, and security threats to important facilities such as aircraft take-off and landing suspension accidents due to the appearance of drones in airports and drone crashes at nuclear power plants. Accordingly, there is an increasing interest in the development of a device for countering the dysfunction of a drone that can effectively respond to illegal drones.

Existing dysfunctional countermeasures focused on drone detection technology using terrestrial radar, RF scanners, electro-optical/infrared (EO/IR) cameras, etc., and neutralization technology using physical methods or jamming devices. However, these dysfunctional countermeasures lack drone identification technology, so there are limitations in responding to illegal drones, such as follow-up measures such as identifying liability and insurance handling in the event of a drone accident, and unilateral suspension of operation without considering the purpose of drone operation.

In order to overcome this, there is a recent movement to further develop a drone ID identification device capable of identifying unique information (drone ID, location information, etc.) of a drone. The device for countering the dysfunction of a drone that identifies the unique information of the drone is used by mounting various types of antennas depending on the purpose. In the case of a radar-based detection device, a phased array antenna is mounted to form a beam pattern in a desired direction because it is mainly installed outside a no-fly zone to detect drones approaching from the outside. One antenna can detect drones appearing at a range of −45 degrees to 45 degrees in the horizontal direction and a range of 0 degrees to 45 degrees in a vertical direction. However, there is a limit to the direction in which the drone can be detected because there is a limit to forming and utilizing both the horizontal and vertical beam patterns.

In the case of an omni antenna used in an RF scanner or a dome-type jammer, it can transmit or receive signals in all directions, but has a disadvantage that the radio wave reach distance is short.

Unlike aircraft, drones can take off and land at any point, so it is not easy to predict the point of appearance. Therefore, an omnidirectional antenna structure and technology are needed to effectively identify drones appearing at any point.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present disclosure has been made in an effort to provide an antenna apparatus for drone identification capable of effectively receiving an identification signal of a drone appearing in an arbitrary direction, and an operating method thereof.

According to an embodiment of the present disclosure, an antenna apparatus for drone identification is provided. The antenna apparatus includes: a plurality of horizontal directional antennas; a vertical directional antenna positioned at a center of an area surrounded by the plurality of horizontal directional antennas; a beamforming unit controlling beamforming of the vertical directional antenna and the plurality of horizontal antennas to transmit and receive signals in all directions; and a power supply unit for suppling power.

In an implementation, the plurality of horizontal antennas may be arranged in a circular shape while being spaced apart by a predetermined interval.

In an implementation, each of the plurality of horizontal antennas may be a dipole antenna.

In an implementation, each of the plurality of horizontal antennas may be a phased array antenna.

In an implementation, the plurality of horizontal antennas may include: a first phased array antenna disposed on a first plane corresponding to a first direction; a second phased array antenna disposed on a second plane corresponding to a second direction; a third phased array antenna disposed on a third plane corresponding to a third direction; and a fourth phased array antenna disposed on a fourth plane corresponding to a fourth direction.

In an implementation, the beam forming unit may include: a phase shifter configured to perform phase control and beamforming of a signal through the plurality of horizontal antennas; a switch configured to select a signal through one of the plurality of horizontal antennas or a signal through the vertical antenna; a combining/dividing unit configured to combine and divide a signal through at least one of the plurality of horizontal antennas and a signal through the vertical antenna; and a signal processing unit configured to control azimuth and elevation angles related to the plurality of horizontal antennas and the vertical antenna.

In an implementation, the signal processing unit may perform control on the azimuth and elevation angles based on an adjustment signal obtained by setting an observation ratio for a corresponding direction to be higher than an observation ratio for other directions according to a corresponding direction set based on appearance information of a drone.

In an implementation, the signal processing unit may perform control on the azimuth and elevation angles based on an adjustment signal obtained according to one of a manner of sequentially operating the horizontal antennas and the vertical antenna and a manner of randomly operating the horizontal antennas and the vertical antenna.

In an implementation, the antenna apparatus may further include an interface unit that is connected to a device for drone identification and provides a signal output from the beamforming unit through the horizontal antennas and the vertical antenna to the device, and provides a signal from the device to the beamforming unit.

Another embodiment of the present disclosure provides a method of operating an antenna apparatus. The method includes: setting an observation ratio for a corresponding direction to be higher than an observation ratio for other directions according to the corresponding direction set based on appearance information of a drone; controlling azimuth and elevation angles of a horizontal antenna and a vertical antenna of the antenna apparatus according to the set observation ratio; selecting one of a manner of sequentially operating antennas and a manner of randomly operating antennas when there is no the appearance information of a drone; and controlling azimuth and elevation angles of a horizontal antenna and a vertical antenna of the antenna apparatus according to the selected manner, wherein the antenna arrangement comprises a plurality of horizontal antennas and a vertically directional antenna positioned at a center of an area surrounded by the plurality of horizontal antennas.

In an implement, the plurality of horizontal antennas may be arranged in a circular shape while being spaced apart by a predetermined interval.

In an implementation, the plurality of horizontal antennas may include: a first phased array antenna disposed on a first plane corresponding to a first direction; a second phased array antenna disposed on a second plane corresponding to a second direction; a third phased array antenna disposed on a third plane corresponding to a third direction; and a fourth phased array antenna disposed on a fourth plane corresponding to a fourth direction.

DETAILED DESCRIPTION OF THE EMBODIMENTS

Figure 1:
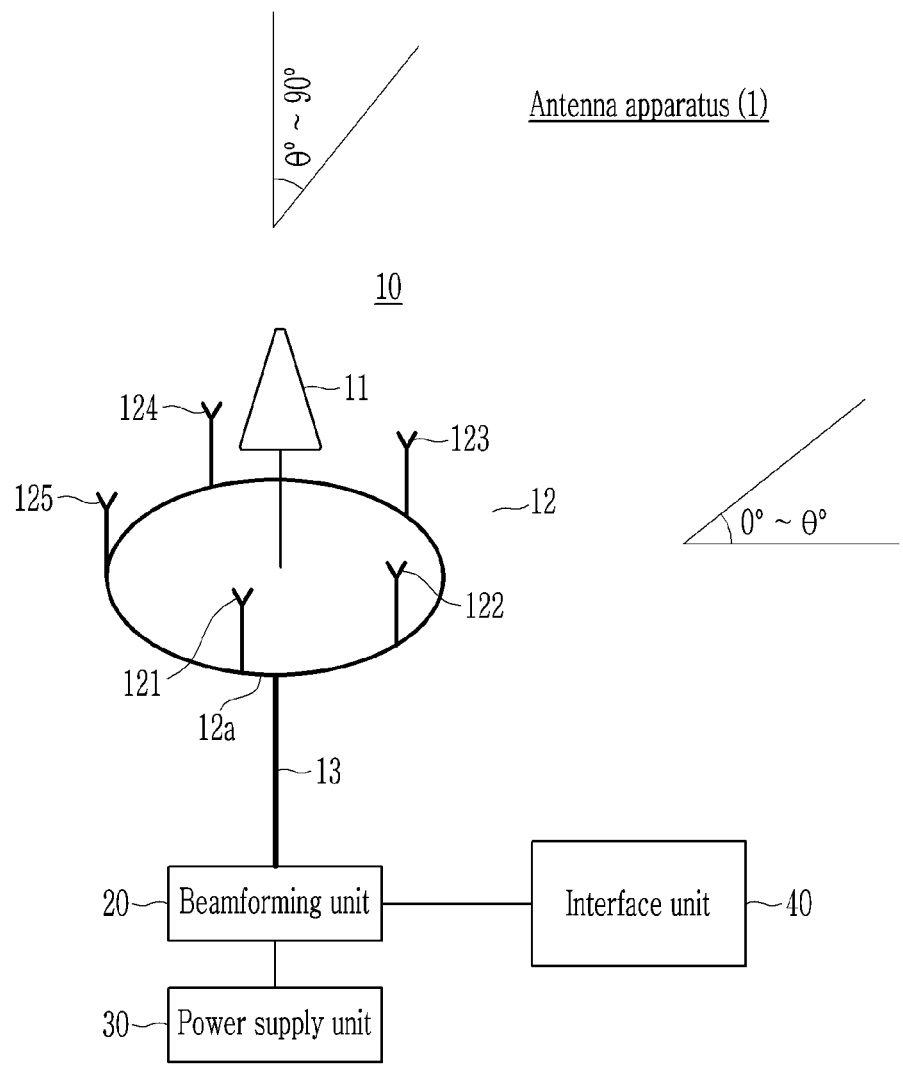
FIG. 1 is a diagram illustrating a structure of an antenna apparatus for drone identification according to a first embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification. Throughout the specification, unless explicitly described to the contrary, the word "comprise", and variations such as "comprises" or "comprising", will be understood to imply the inclusion of stated elements but not the exclusion of any other elements. The expressions described in the singular may be interpreted as singular or plural unless an explicit expression such as "one", "single", and the like is used. In addition, terms including ordinal numbers such as "first" and "second" used in embodiments of the present disclosure may be used to describe components, but the components should not be limited by the terms. The terms are only used to distinguish one component from another. For example, without departing from the scope of the present disclosure, a first component may be referred to as a second component, and similarly, the second component may be referred to as the first component.

Hereinafter, an antenna apparatus for drone identification and an operation method thereof according to an embodiment of the present disclosure will be described with reference to the accompanying drawings.

FIG. 1 is a diagram illustrating a structure of an antenna apparatus for drone identification according to a first embodiment of the present disclosure.

The antenna apparatus 1 for drone identification according to the first embodiment of the present disclosure includes an antenna unit 10 as shown in FIG. 1. In addition, the antenna apparatus 1 further includes a beamforming unit 20, a power supply unit 30, and an interface unit 40.

The antenna unit 10 includes a vertical antenna 11 and a plurality of horizontal antennas 12. Here, the horizontal antenna 12 will be described as an example of five horizontal antennas 121 to 125. However, the present disclosure is not limited thereto.

The vertical antenna 11 is a vertical directional antenna, and the horizontal antennas 121 to 125 are horizontal single antennas, for example, dipole antennas.

In an embodiment of the present disclosure, the horizontal antennas 121 to 125 are disposed at a set interval in a three-dimensional space, and the vertical antenna 11 is disposed in the center thereof. For example, as in FIG. 1, the horizontal antennas 121 to 125 are arranged at a predetermined interval in a form of a circular shape, and the vertical antennas 11 are disposed at the center position of the circle formed by the horizontal direction antennas 121 to 125. Each of the antennas 11 and 121 to 125 arranged in this way is connected to the beamforming unit 20 through an antenna line 13.

The beamforming unit 20 performs phase control and beamforming of a signal transmitted and received through the antenna unit 10.

Figure 2:
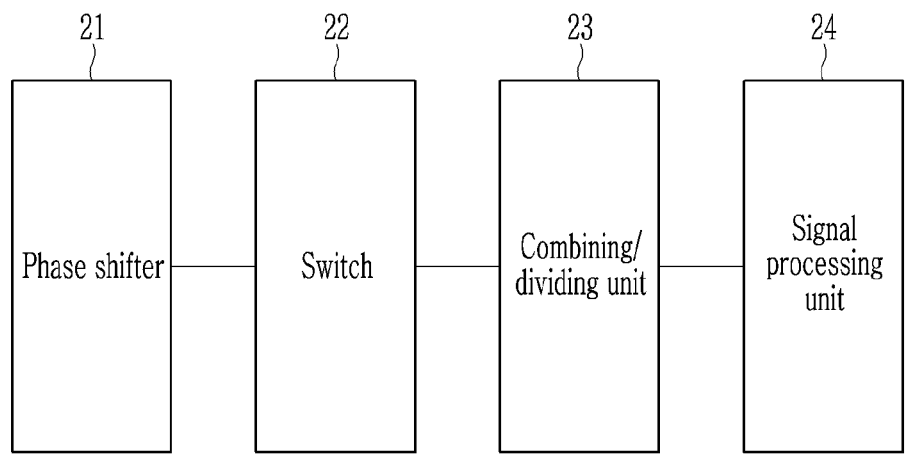
FIG. 2 is a diagram illustrating a structure of a beamforming unit according to an embodiment of the present disclosure.

FIG. 2 is a diagram illustrating a structure of a beamforming unit according to an embodiment of the present disclosure.

As shown in FIG. 2, the beamforming unit 20 is a phase shifter 21 for phase control and beamforming of a signal (for convenience of description, referred to as a horizontal direction signal) through the horizontal antennas 121 to 125, a switch 22 for selecting a horizontal direction signal or a vertical direction signal, a combining/dividing unit for combining and dividing a signal through the vertical direction antenna 11 (for convenience of explanation, referred to as a vertical direction signal) and a horizontal direction signal, and a signal processing unit 24.

The signal processing unit 24 performs phase shifter control for adjusting the azimuth angle of the horizontal antennas 121 to 125, elevation angle control of the horizontal antennas 121 to 125, control for selection of vertical and horizontal direction signals, operation sequence control, etc.

The azimuth (horizontal direction) is determined in the range of 0 degrees to 360 degrees, and the phase shifter 21 performs the phase control and beamforming of the signal transmitted and received through the horizontal antennas 121 to 125 according to the azimuth determined by the signal processing unit 24, so that a radio identification signal in the range of 0 degrees to 360 degrees in a horizontal direction is transmitted and received through the horizontal antennas 121 to 125. A horizontal beam, that is, a horizontal signal, may be controlled in a horizontal direction (an azimuth angle) in units of x degrees through the phase shifter 21.

The elevation angle (vertical direction) is determined within the range of 0 degrees to θ degrees, and a radio identification signal in the range of θ degrees to 0 degrees in a vertical direction (an elevation angle) is transmitted and received through the horizontal antennas 121 to 125 according to the elevation angle determined by the signal processing unit 24.

The signal processing unit 24 adjusts and controls the inclination of the horizontal antennas 121 to 125 to further expand the range of the elevation angle θ that enables wireless identification through beamforming for the horizontal antennas 121 to 125. For example, when performing beamforming using five dipole antennas (horizontal antennas 121 to 125) as in FIG. 1, the azimuth angle is controlled in units of x degrees (e.g., in units of 15 degrees). However, since the elevation angle is not controlled in arbitrary angular units and the area covered when transmitting and receiving a signal through a dipole antenna ranges from −θ degrees to θ degrees, a radio identification signal in the vertical direction (an elevation angle) ranges from 0 degrees to θ degrees is transmitted and received.

In order to control not only the horizontal direction using a plurality of dipole antennas but also the vertical direction (elevation angle) in arbitrary angular units, a method of adjusting the inclination of the antenna itself may be used. In order to change the range of the elevation angle (vertical direction) of the antenna to be larger than θ degrees, the angle (inclination) of the antennas 121 to 125 configured for the horizontal direction signal or the circular frame 12a supporting the antenna can be adjusted/controlled mechanically. That is, by using a separate mechanical means, the angle (inclination) of the antennas 121 to 125 or the angle of the circular frame 12a is adjusted in the vertical direction to change the range of the elevation angle (vertical direction) to be greater than θ degrees. For example, radio signals in the range of 0 degrees to θ degrees are transmitted and received in the vertical direction (elevation angle) in a prior art, but when the inclination of the horizontal antennas 121 to 125 is adjusted by 10 degrees through mechanical control, after adjusting the angle, it is possible to transmit and receive radio signals in the range of 10 degrees to θ+10 degrees in the vertical direction (an elevation angle).

Meanwhile, the vertical antenna 11 transmits and receives a radio identification signal having an elevation angle of θ degrees or more.

On the other hand, the power supply unit 30 supplies power to each unit 10, 20, and 40. The interface unit 40 is configured to interface with an external device. The interface unit 40 is configured to interface with a device to be operated by being connected to the antenna apparatus 1 according to an embodiment of the present disclosure, such as a ground drone identifier (not shown). The interface unit 40 transmits the radio identification signal received through the antenna apparatus 1 to an external device, for example, a ground drone identifier (not shown).

On the other hand, here, the antenna apparatus 1 is implemented in a form including the beamforming unit 20, the power supply unit 30, and the interface unit 40, but depending on the operation/implementation of the ground drone identifier, the beamforming unit 20, the power supply unit 30, and the interface unit 40 may be implemented in a form included in the ground drone identifier.

Figure 3:
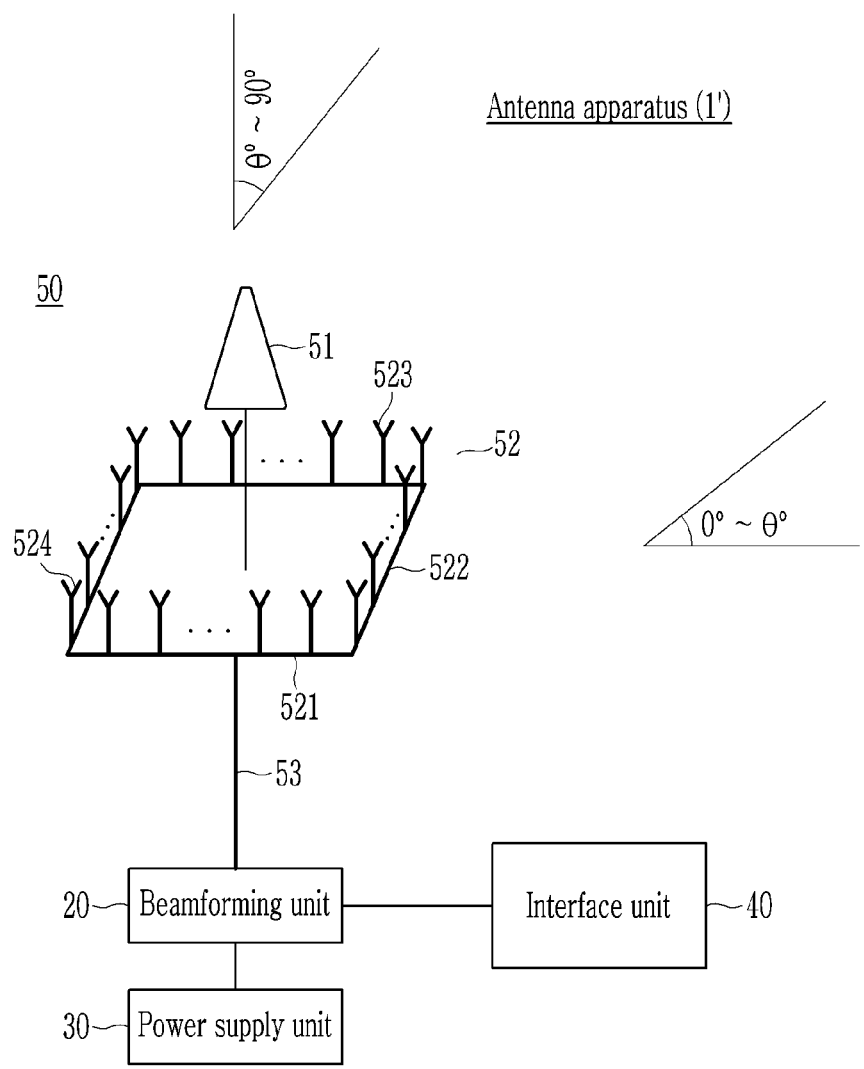
FIG. 3 is a diagram illustrating a structure of an antenna apparatus for drone identification according to a second embodiment of the present disclosure.

FIG. 3 is a diagram illustrating a structure of an antenna apparatus for drone identification according to a second embodiment of the present disclosure.

An antenna apparatus 1' for drone identification according to a second embodiment of the present disclosure includes an antenna unit 50 as shown in FIG. 3. In addition, the antenna apparatus 1 further includes a beamforming unit 20, a power supply unit 30, and an interface unit 40. Components having the same structure as those of the first embodiment and performing the same functions are assigned the same identification numbers as those of the first embodiment.

The antenna unit 50 includes a vertical antenna 51 and a plurality of phased array antennas 52. Here, the phased array antennas 52 include four phased array antennas 521 to 524 respectively positioned on four planes. That is, a phased array antenna 521 disposed on a first plane to face a first direction (e.g., south), a phased array antenna 522 disposed on a second plane to face a second direction (e.g., east), a phased array antenna 523 disposed on a third plane to face a third direction (e.g., north), and a phased array antenna 524 disposed on a fourth plane to face a fourth direction (e.g., west) are included. Each of the phased array antennas 521 to 524 transmits and receives a radio identification signal in a range of 90 degrees in a horizontal direction (azimuth) through beamforming. As each of the plurality of phased array antennas 521 to 524 disposed to face each direction (the first direction to the fourth direction) in each plane transmits and receives a radio identification signal in a range of 90 degrees, the transmission and reception of the radio identification signal is performed in a 360-degree range in a horizontal direction. However, the present disclosure is not limited to each phased array antenna transmitting and receiving a radio identification signal in a range of 90 degrees.

The vertical directional antenna 51 is a vertical directional antenna. The vertical antenna 51 is arranged to be positioned at the center of a space formed by the first to fourth planes in which the plurality of phased array antennas 521 to 524 are arranged.

Each of the antennas 51 and 521 to 524 arranged in this way is connected to the beamforming unit 20 through the antenna line 53.

The beamforming unit 20 performs phase control and beamforming of a signal transmitted and received through the antenna unit 50. To this end, the beamforming unit 20 includes a phase shifter 21 for beamforming and phase control of signals (horizontal direction signals) through the phased array antennas 521 to 524, a combining/dividing unit 22 for combining and dividing a signal through a vertical direction antenna 51 (a vertical direction signal) and a horizontal direction signal, a switch 23 for selecting a horizontal direction signal or a vertical direction signal, and a signal processing unit 24.

The signal processing unit 24 performs phase shifter control for adjusting the azimuth angle of the phased array antennas 521 to 524, elevation angle control of the phased array antennas 521 to 524, control for selection of vertical and horizontal direction signals, operation sequence control, etc.

The azimuth angle (a horizontal direction) is determined in the range of 0 degrees to 360 degrees, and the phase shifter 21 performs the phase control and beamforming of the signals transmitted and received through the phased array antennas 521 to 524 according to the azimuth angle determined by the signal processing unit 24, so that a radio identification signal in the range of 0 degrees to 360 degrees in a horizontal direction is transmitted and received through the phased array antennas 521 to 524.

A horizontal beam, that is, a horizontal direction signal, may be controlled in a horizontal direction (an azimuth angle) in units of x degrees through the phase shifter 21.

The elevation angle (a vertical direction) is determined within the range of 0 degrees to θ degrees, and radio identification signals in the range of 0 degrees to θ degrees in the vertical direction (elevation angle) are transmitted and received through the phased array antennas 521 to 524 according to the elevation angle determined by the signal processing unit 24.

Meanwhile, the vertical antenna 51 transmits and receives a radio identification signal having an elevation angle of θ degrees or more.

The signal processing unit 24 adjusts and controls the inclination of the phased array antennas 521 to 524 in order to further expand the range of the elevation angle θ that enables wireless identification through beamforming for the phased array antennas 521 to 524. In the case of the phased array antennas 521 to 524, there is an antenna whose elevation angle can be adjusted even through the phase control of the phase shifter 21. In this case, the elevation angle is adjusted by controlling the phase of the phase shifter 21 and/or adjusting the inclination of the phased array antennas 521 to 524.

On the other hand, the power supply unit 30 supplies power to each unit 50, 20, and 40. The interface unit 40 is configured to interface with an external device. The interface unit 40 is configured to interface with a device to be operated by being connected to the antenna apparatus 1' according to an embodiment of the present disclosure, such as a ground drone identifier (not shown). The interface unit 40 transmits the radio identification signal received through the antenna apparatus 1' to an external device, for example, a ground drone identifier (not shown).

On the other hand, in the antenna apparatus 1' according to the second embodiment of the present disclosure having such a structure, instead of disposing the phased array antennas 521 to 524 on four planes in the antenna unit 50, respectively, a cylindrical phased array antenna may be used. In this case, since the phased array antenna is implemented in a cylindrical shape, the radio identification signal can be transmitted and received in a 360-degree range in the horizontal direction (an azimuth angle) through beamforming.

In the same manner as in the first embodiment, the antenna apparatus 1' is implemented in a form including the beamforming unit 20, the power supply unit 30, and the interface unit 40, but depending on the operation/implementation of the ground drone identifier, the beamforming unit 20, the power supply unit 30, and the interface unit 40 may be implemented in a form included in the ground drone identifier.

The antenna apparatus according to the first and second embodiments disclosed above can be used in all of a drone detection device, a drone identification device, and a neutralizing device.

Next, a process for identifying ground drones based on the antenna apparatus having this structure will be described.

Figure 4:
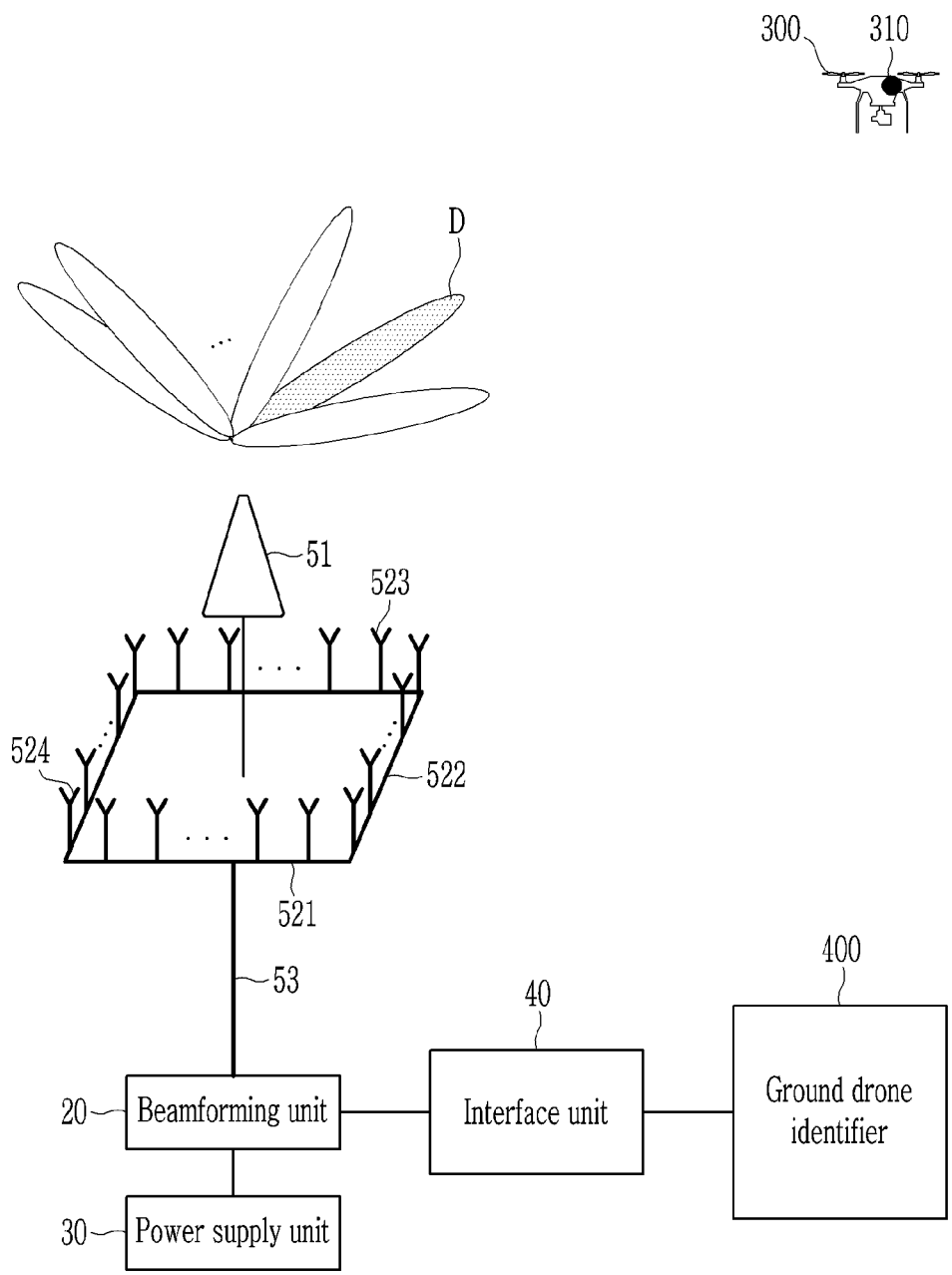
FIG. 4 is an exemplary diagram illustrating a process of identifying a ground drone based on an antenna apparatus according to an embodiment of the present disclosure.
Figure 5:
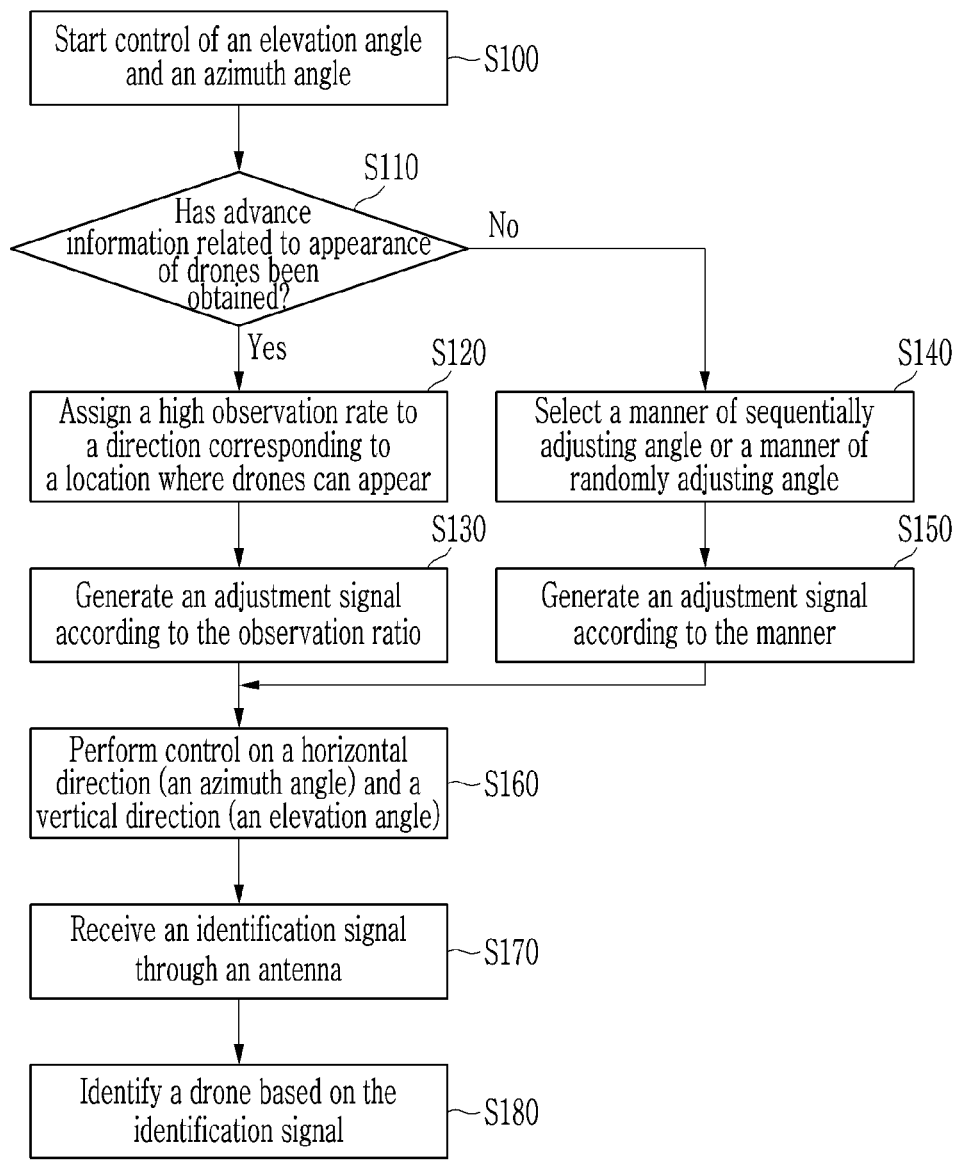
FIG. 5 is a flowchart illustrating a method of operating an antenna apparatus according to an embodiment of the present disclosure.

FIG. 4 is an exemplary diagram illustrating a process of identifying a ground drone based on an antenna apparatus according to an embodiment of the present disclosure, and FIG. 5 is a flowchart illustrating an operation method of the antenna apparatus according to an embodiment of the present disclosure.

Here, a process for identifying a ground drone will be described taking the antenna apparatus 1' according to the second embodiment of the present disclosure as an example, and this process may be equally applied to the antenna apparatus 1 according to the first embodiment.

As illustrated in FIG. 4, in order to effectively identify the drone 300 appearing from any direction, the antenna apparatus 1' according to an embodiment of the present disclosure operates as an omni-directional ground identifier antenna.

For example, it is assumed that the drone 300 appears in the 1 o'clock direction. The on-board identification device 310 is mounted on the drone 300. The on-board identification device 310 periodically transmits the drone's unique information (e.g., drone ID, location information, etc.) to the ground drone identifier 400 on the ground. The antenna apparatus 1' according to an embodiment of the present disclosure is connected to the ground drone identifier 400.

When the separation distance between the drone 300 and the ground drone identifier 400 is long and the direction of the antenna unit 50 of the antenna apparatus 1' is not directed to the drone 300, the ground drone identifier 400 does not recognize whether drones have appeared nearby. Therefore, the ground drone identifier 400 continuously adjusts the horizontal direction (an azimuth angle) and the vertical direction (an elevation angle) of the omni-directional antenna (the antenna unit 50) of the antenna apparatus 1' according to a predetermined drone identifier operation guideline to receive drone unique information transmitted from the drone that appears near a point where it is installed.

Specifically, as shown in FIG. 5, when the control of the elevation angle and azimuth angle for the antenna apparatus 1' is started (S100), the control is performed according to whether there is advance information related to the appearance of drones.

Unlike an aircraft, the drone 300 can take off and land at any point, and thus it is difficult to predict the appearance point of drones. Accordingly, in order to identify the drone appearing at an arbitrary point as quickly as possible, it is necessary to effectively control the horizontal direction (an azimuth angle) and vertical direction (an elevation angle) of the antenna. For example, when a ground drone identifier is installed at the boundary of a no-fly zone or a restricted-fly zone to identify a drone that is approaching mainly from the outside, or when the ground drone identifier can roughly grasp the location information where the drone appears by linking it with a drone detection device, etc., the horizontal direction (an azimuth angle) and the vertical direction (an elevation angle) of the omni-directional antenna (the antenna unit) are adjusted by allocating a high observation rate for the corresponding direction. For example, when information on a location where drones mainly appear is obtained based on actual drone detection information and statistical information related to past drone observation history, a high observation rate for the direction corresponding to the location is assigned, and a low observation ratio is assigned for other directions (S110, S120). An adjustment signal for adjusting the horizontal direction (an azimuth angle) and the vertical direction (an elevation angle) is generated according to the assigned observation ratio (S130). For example, if a detection device recognizes that a drone has appeared at an altitude angle of 30 degrees in the 1 o'clock direction, the azimuth angle (a horizontal direction) through phase control is adjusted to that direction, and the elevation angle can be adjusted as needed to transmit and receive a signal at an altitude angle of 30 degrees. If there is no information on the appearance of drones from detection devices, etc., but there is statistics information on that drones appeared in the 3 o'clock: 6 o'clock: 9 o'clock: 12 o'clock direction at a rate of 10%: 20%: 30%: 40% in the vicinity of a specific observation area, the operating time of the horizontal antenna to transmit and receive drone identification signals based on the statistical information is set at 3 o'clock: 6 o'clock: 9 o'clock: 12 o'clock=10%: 20%: 30%: 40% and each phase control is performed to adjust the direction of the antenna.

On the other hand, if there is no advance information related to the appearance of a drone, one of a manner of sequentially applying horizontal/vertical antenna angle adjustment (for example, similar to the manner of sequentially illuminating light in a clockwise/counterclockwise direction from a lighthouse) and a manner of randomly applying horizontal/vertical antenna angle adjustment is selected (S140). Then, an adjustment signal for adjusting the horizontal direction (an azimuth angle) and the vertical direction (an elevation angle) of the omni-directional antenna (the antenna unit) is generated according to the selected manner (S150).

An adjustment signal from the ground drone identifier 400 based on this adjustment is transmitted to the antenna apparatus 1', and the interface unit 40 of the antenna apparatus 1' sends the adjustment signal transmitted from the ground drone identifier 400 to the beamforming unit 20. The signal processing unit 24 of the beamforming unit 20 performs phase control and beamforming through the phase shifter 21 based on the adjustment signal. Accordingly, the directions of the phased array antennas 521 to 524 and the vertical direction antenna 51 are directed toward the location (D of FIG. 4) where the drone 300 is (S160).

Afterwards, when the distance between the drone 300 and the ground drone identifier 400 (or the antenna apparatus 1') is sufficiently close to receive a signal, the ground drone identifier 400 receives the unique information (drone ID, location information, etc.) transmitted from the on-board identification device 310 of the drone 300 (S170). That is, the antenna apparatus 1' receives a signal corresponding to the unique information of the drone and outputs a corresponding radio identification signal, and the radio identification signal is transmitted to the ground drone identifier 400 through the interface unit 40. Thereafter, the ground drone identifier 400 acquires unique information about the corresponding drone 400 based on the radio identification signal (S180).

In this process, steps S100 to S150 and S180 may be performed by the ground drone identifier 400, and steps S160 and S170 may be performed by the antenna apparatus 1 or 1'.

Figure 6:
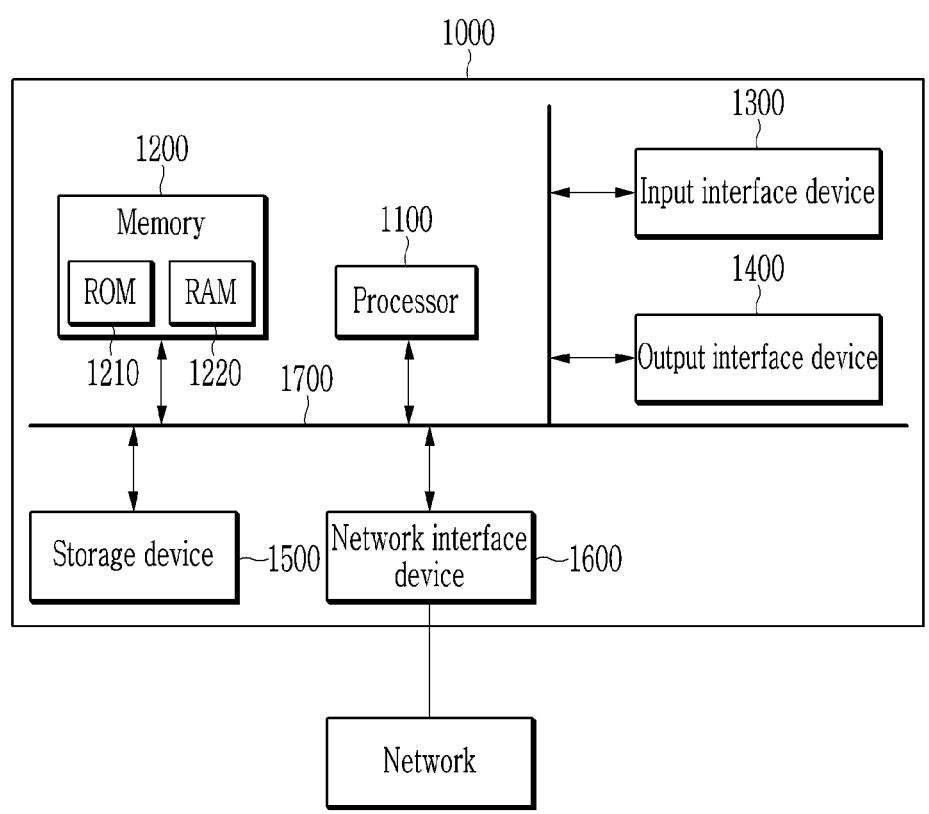
FIG. 6 is a structural diagram illustrating a computing device for implementing an operating method according to an embodiment of the present disclosure.

FIG. 6 is a structural diagram illustrating a computing device for implementing an operating method according to an embodiment of the present disclosure.

As illustrated in FIG. 6, the operating method according to an embodiment of the present disclosure may be implemented using the computing device 1000.

The computing device 1000 may include at least one of a processor 1100, a memory 1200, an input interface device 1300, an output interface device 1400, a storage device 1500, and a network interface device 1600. Each of the components may be connected by a bus 1700 to communicate with each other. In addition, each of the components may be connected through an individual interface or a separate bus with the processor 1100 as the center instead of the common bus 1700.

The processor 1100 may be implemented as various types such as an application processor (AP), a central processing unit (CPU), a graphics processing unit (GPU), and the like, and may be any semiconductor device that executes an instruction stored in the memory 1200 or the storage device 1500. The processor 1100 may execute a program command stored in at least one of the memory 1200 and the storage device 1500. The processor 1100 may be configured to implement the functions and methods described based on FIGS. 4 and 5 above. For example, the processor 1100 may be configured to the function of the ground drone identifier.

In addition, the processor 1100 may communicate with another processor through the bus 1700 or communicate with another device on a network through the network interface device 1600.

The memory 1200 and the storage device 1500 may include various types of volatile or non-volatile storage media. For example, the memory may include a read-only memory (ROM) 1210 and a random access memory (RAM) 1220. In an embodiment of the present disclosure, the memory 1200 may be located inside or outside the processor 1100, and the memory 1200 may be connected to the processor 1100 through various known means.

The input interface device 1300 is configured to provide data to the processor 1100, and the output interface device 1400 is configured to output data from the processor 1100.

The network interface device 1600 is configured to communicate with another device through a wired network or a wireless network.

The computing device 1000 having such a structure is called a ground drone identifier, a drone detection device, or a drone neutralizing device, and may implement the operation method according to an embodiment of the present disclosure.

In addition, at least a part of the phase information processing method according to an embodiment of the present disclosure may be implemented as a program or software executed in the computing device 1000, and the program or software may be stored in a computer-readable medium.

In addition, at least a part of the phase information processing method according to an embodiment of the present disclosure may be implemented as hardware capable of being electrically connected to the computing device 1000.

According to embodiments, it is possible to effectively receive an identification signal of a drone appearing in an arbitrary direction in all directions. In particular, by forming beam patterns in both the horizontal and vertical directions, the drone's identification signal can be received in all directions. Therefore, it is possible to effectively track and integrate illegal and threat drones in real time when drones appear by interworking with a drone ground identifier.

The embodiments of the present disclosure are not implemented only through the apparatus and/or method described above, but may be implemented through a program for realizing a function corresponding to the configuration of the embodiment of the present disclosure, and a recording medium in which the program is recorded. This implementation can also be easily performed by expert person skilled in the technical field to which the present disclosure belongs from the description of the above-described embodiments.

The components described in the embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the embodiments may be implemented by software, and the software may be recorded on a recording medium. The components, functions, and processes described in the embodiments may be implemented by a combination of hardware and software.

The method according to embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages, and may be deployed in any form including a stand-alone program or a module, a component, a subroutine, or other units appropriate for use in a computing environment. A computer program may be deployed to be executed on one computer or on multiple computers at one site or distributed across multiple sites and interconnected by a communication network. Processors appropriate for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic disks, magneto-optical disks, or optical disks. Examples of information carriers appropriate for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk, and a read only memory (ROM), a random access memory (RAM), a flash memory, an erasable programmable ROM (EPROM), and an electrically erasable programmable ROM (EEPROM), and any other known computer readable medium. A processor and a memory may be supplemented by, or integrated with, a special purpose logic circuit. The processor may run an operating system (OS) and one or more software applications that run on the OS. The processor device also may access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific embodiment. Features described in the specification in the context of individual embodiments may be implemented as a combination in a single embodiment. In contrast, various features described in the specification in the context of a single embodiment may be implemented in multiple embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood that the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described embodiments in all embodiments, and it should be understood that the above-described program components and apparatuses may be incorporated into a single software product or may be packaged in multiple software products. It should be understood that the embodiments disclosed herein are merely illustrative and are not intended to limit the scope of the disclosure. It will be apparent to one of ordinary skill in the art that various modifications of the embodiments may be made without departing from the spirit and scope of the claims and their equivalents.

What is claimed is:

1. An antenna apparatus for drone identification, comprising:
   a plurality of horizontal directional antennas;
   a vertical directional antenna positioned at a center of an area surrounded by the plurality of horizontal directional antennas;
   a beamforming unit controlling beamforming of the vertical directional antenna and the plurality of horizontal antennas to transmit and receive signals in all directions;
   an interface unit that is connected to a device for drone identification and provides a signal output from the beamforming unit through the horizontal antennas and the vertical antenna to the device, and provides a signal from the device to the beamforming unit; and
   a power supply unit for suppling power.

2. The antenna apparatus of claim 1, wherein the plurality of horizontal antennas are arranged in a circular shape while being spaced apart by a predetermined interval.

3. The antenna apparatus of claim 1, wherein each of the plurality of horizontal antennas is a dipole antenna.

4. The antenna apparatus of claim 1, wherein each of the plurality of horizontal antennas is a phased array antenna.

5. The antenna apparatus of claim 4, wherein
the plurality of horizontal antennas comprise:
a first phased array antenna disposed on a first plane corresponding to a first direction;
a second phased array antenna disposed on a second plane corresponding to a second direction;
a third phased array antenna disposed on a third plane corresponding to a third direction; and
a fourth phased array antenna disposed on a fourth plane corresponding to a fourth direction.

6. The antenna apparatus of claim 1, wherein
the beam forming unit comprises:
a phase shifter configured to perform phase control and beamforming of a signal through the plurality of horizontal antennas;
a switch configured to select a signal through one of the plurality of horizontal antennas or a signal through the vertical antenna;
a combining/dividing unit configured to combine and divide a signal through at least one of the plurality of horizontal antennas and a signal through the vertical antenna; and
a signal processing unit configured to controlling azimuth and elevation angles related to the plurality of horizontal antennas and the vertical antenna.

7. The antenna apparatus of claim 6, wherein
the signal processing unit performs control of the azimuth and elevation angles based on an adjustment signal obtained by setting an observation ratio for a corresponding direction to be higher than an observation ratio for other directions according to the corresponding direction set based on appearance information of a drone.

8. The antenna apparatus of claim 6, wherein
the signal processing unit performs control on the azimuth and elevation angles based on an adjustment signal obtained according to one of a manner of sequentially operating the horizontal antennas and the vertical antenna and a manner of randomly operating the horizontal antennas and the vertical antenna.

9. A method of operating an antenna apparatus comprising:
setting an observation ratio for a corresponding direction to be higher than an observation ratio for other directions according to the corresponding direction set based on appearance information of a drone;
controlling azimuth and elevation angles of a horizontal antenna and a vertical antenna of the antenna apparatus according to the set observation ratio;
selecting one of a manner of sequentially operating antennas and a manner of randomly operating antennas when there is no appearance information of a drone; and
controlling azimuth and elevation angles of a horizontal antenna and a vertical antenna of the antenna apparatus according to the selected manner,
wherein the antenna arrangement comprises a plurality of horizontal antennas and a vertically directional antenna positioned at a center of an area surrounded by the plurality of horizontal antennas.

10. The method of claim 9, wherein
the plurality of horizontal antennas are arranged in a circular shape while being spaced apart by a predetermined interval.

11. The method of claim 9, wherein
the plurality of horizontal direction antennas comprise:
a first phased array antenna disposed on a first plane corresponding to a first direction;
a second phased array antenna disposed on a second plane corresponding to a second direction;
a third phased array antenna disposed on a third plane corresponding to a third direction; and
a fourth phased array antenna disposed on a fourth plane corresponding to a fourth direction.

* * * * *